(12) United States Patent
Horikoshi et al.

(10) Patent No.: US 8,635,568 B2
(45) Date of Patent: Jan. 21, 2014

(54) SEMICONDUCTOR DEVICE AND DESIGNING METHOD OF THE SAME

(75) Inventors: Yoshitaka Horikoshi, Kanagawa (JP); Toshiyuki Saito, Kanagawa (JP)

(73) Assignee: Renesas Electronics Corporation, Kawasaki, Kanagawa (JP)

( * ) Notice: Subject to any disclaimer, the term of this patent is extended or adjusted under 35 U.S.C. 154(b) by 0 days.

(21) Appl. No.: 13/609,021

(22) Filed: Sep. 10, 2012

(65) Prior Publication Data
US 2013/0002331 A1    Jan. 3, 2013

Related U.S. Application Data

(63) Continuation of application No. 12/926,001, filed on Oct. 20, 2010, now Pat. No. 8,341,576.

(30) Foreign Application Priority Data

Oct. 23, 2009    (JP) .................................. 2009-244943

(51) Int. Cl.
*G06F 17/50*    (2006.01)

(52) U.S. Cl.
USPC ............................ 716/113; 716/104; 716/132

(58) Field of Classification Search
USPC ......................................... 716/104, 113, 132
See application file for complete search history.

(56) References Cited

U.S. PATENT DOCUMENTS

| | | | |
|---|---|---|---|
| 6,157,247 A | 12/2000 | Abdesselem et al. | |
| 6,943,613 B2 | 9/2005 | Miyazaki et al. | |
| 6,967,522 B2 | 11/2005 | Chandrakasan et al. | |
| 7,093,143 B2 | 8/2006 | Ito et al. | |
| 7,643,365 B2 | 1/2010 | Meguro et al. | |
| 7,661,079 B2 | 2/2010 | Ogawa | |
| 8,350,589 B2 * | 1/2013 | Chlipala et al. | ................. 326/16 |
| 2002/0135416 A1 | 9/2002 | Hashiguchi | |
| 2005/0225376 A1 | 10/2005 | Kin Law | |
| 2005/0254325 A1 | 11/2005 | Meguro et al. | |
| 2008/0129341 A1 | 6/2008 | Mochizuki | |

FOREIGN PATENT DOCUMENTS

| | | |
|---|---|---|
| JP | H04-119008 A | 4/1992 |
| JP | H11-195967 A | 7/1999 |
| JP | 2001-244421 A | 9/2001 |
| JP | 2005-322860 A | 11/2005 |
| JP | 2007-258569 A | 10/2007 |
| JP | 2008-141013 A | 6/2008 |

OTHER PUBLICATIONS

U.S. Office Action dated Mar. 26, 2012 in U.S. Appl. No. 12/926,001.
Japanese Notification of Reason for Refusal with English translation dated Oct. 18, 2013.

* cited by examiner

*Primary Examiner* — Thuan Do
(74) *Attorney, Agent, or Firm* — McGinn IP Law Group, PLLC

(57) ABSTRACT

A semiconductor device includes a control target circuit section and a voltage control section configured to dynamically control a supply voltage to the control target circuit section. The control target circuit section includes a delay monitor circuit configured to measure a delay in the control target circuit section as a monitor delay and a target delay register configured to store target delay data for a target value of the monitor delay and which is set before the measuring of the delay, based on an external signal. The delay monitor circuit compares the monitor delay and the target delay and sends a comparison resultant signal to the voltage control section to show a result of the comparison. The voltage control section controls the supply voltage based on the comparison resultant signal such that the monitor delay approaches to the target delay.

15 Claims, 14 Drawing Sheets

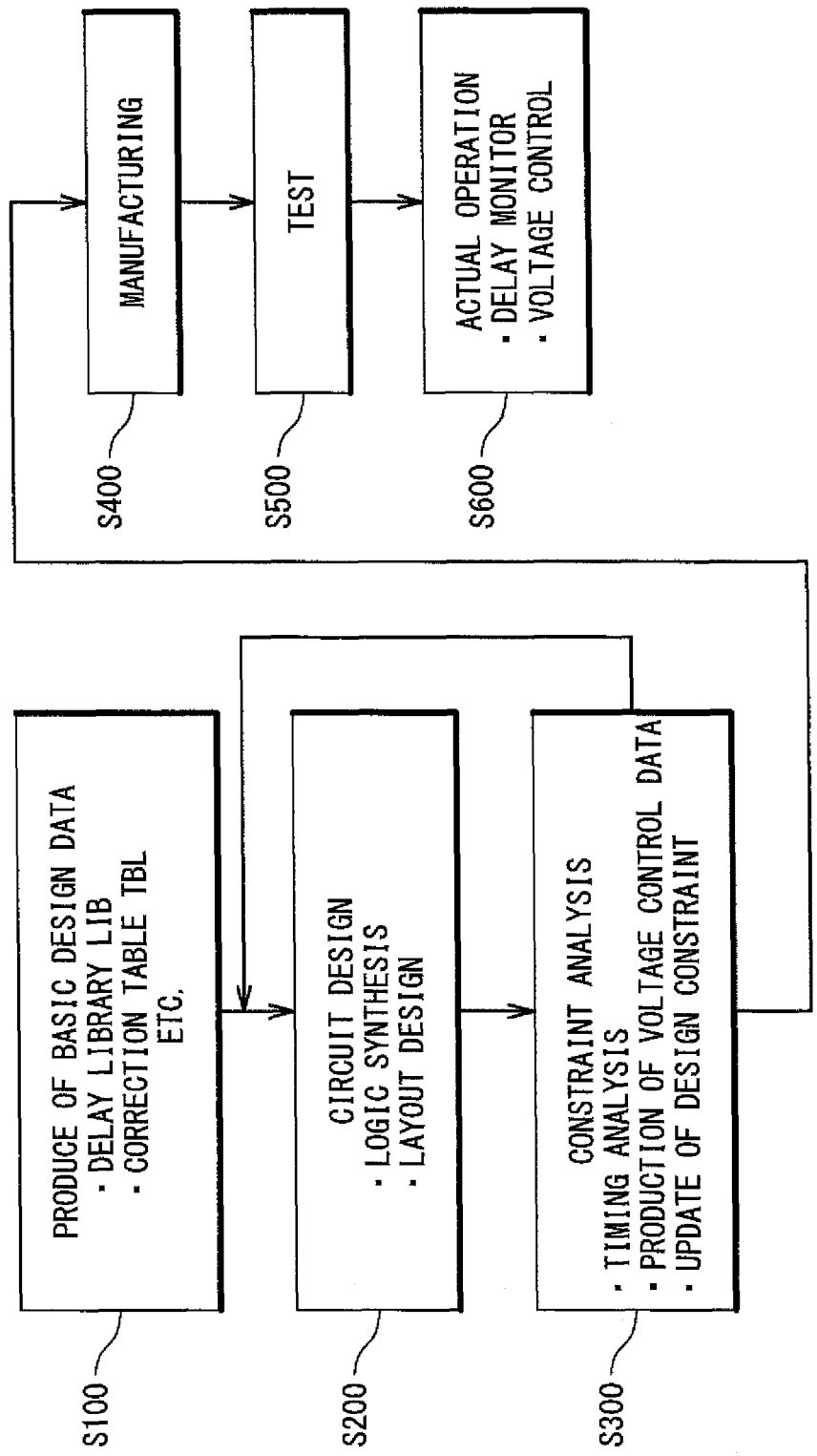

Fig. 6

| DELAY CORRECTION COEFFICIENT ($\alpha$) | VOLTAGE CORRECTION COEFFICIENT |
|---|---|
| 0.8 | 1.3 |
| ... | ... |
| 0.98 | 1.12 |
| 0.99 | 1.11 |
| 1 | 1.1 |
| 1.01 | 1.09 |
| 1.02 | 1.08 |
| ... | ... |
| 1.2 | 0.9 |

CLK_S + DATA + SETUP TIME < CLK_T + CLOCK PERIOD

MARGIN CORRECTION TABLE MGN

| DISTANCE | MOUNT NUMBER | | | | | |
|---|---|---|---|---|---|---|
| | 1 | 2 | 3 | 4 | 5 | 6 |
| 0 | 0 | 0 | 0 | 0 | 0 | 0 |
| 1000 | 0.010 | 0.008 | 0.006 | 0.004 | 0.002 | 0.001 |
| 2000 | 0.012 | 0.010 | 0.008 | 0.006 | 0.004 | 0.002 |
| 3000 | 0.014 | 0.012 | 0.010 | 0.008 | 0.006 | 0.004 |
| 4000 | 0.016 | 0.014 | 0.012 | 0.010 | 0.008 | 0.006 |
| 5000 | 0.018 | 0.016 | 0.014 | 0.012 | 0.010 | 0.008 |
| 6000 | 0.020 | 0.018 | 0.016 | 0.014 | 0.012 | 0.010 |

$(A+B) \times \alpha M + C \times \alpha L + (D+E) \times \alpha H + \times \alpha H +$ INTERCONNECTION DELAY $<$ TARGET DELAY

CORRECTION TABLE TBL

| αL | αM | αH | VOLTAGE CORRECTION COEFFICIENT |
|---|---|---|---|
| 0.9 | 0.85 | 0.8 | 1.3 |
| ⋮ | ⋮ | ⋮ | ⋮ |
| 0.98 | 0.98 | 0.98 | 1.12 |
| 0.99 | 0.99 | 0.99 | 1.11 |
| 1 | 1 | 1 | 1.1 |
| 1.01 | 1.01 | 1.01 | 1.09 |
| 1.02 | 1.02 | 1.02 | 1.08 |
| ⋮ | ⋮ | ⋮ | ⋮ |
| 1.1 | 1.15 | 1.2 | 0.9 |

SEMICONDUCTOR DEVICE AND DESIGNING METHOD OF THE SAME

INCORPORATION BY REFERENCE

This application is a continuation of U.S. patent application Ser. No. 12/926,001 filed on Oct. 20, 2010 now U.S. Pat. No. 8,341,576, which claims a priority on convention based on Japanese Patent Application No. 2009-244943 filed on Oct. 23, 2009. The disclosure thereof is incorporated herein by reference.

TECHNICAL FIELD

The present invention relates to a semiconductor device and a designing method of the semiconductor device. Particularly, the present invention relates to a semiconductor device having a voltage control function and a designing method of the semiconductor device.

BACKGROUND ART

Generally, in a manufacturing process of a semiconductor device, the physical structure and electric characteristics of elements such as a transistor deviate from design values. Such deviation is called manufacturing variability. It is important to take the manufacturing variability into consideration in processes of circuit design and verification, in order to guarantee a normal operation of the manufactured semiconductor device.

For example, in general static timing analysis (STA), timing analysis is carried out by using a delay value in a corner condition (the worst condition). In other words, a margin according to the manufacturing variability is taken into consideration. By designing a circuit for timing constraints to be satisfied even under the corner condition, a delay due to the manufacturing variability can be absorbed. On the other hand, the design time increases to design a circuit for the timing constraint to be satisfied even under the corner condition.

Patent Literature 1 (Japanese Patent Publication (JP 2007-258569A)) describes a technique to reduce load impressed to a designer of a semiconductor device. Specifically, a level of manufacturing variability to be considered in a design step is lowered lower than that in case of a general design. After the semiconductor device is actually produced, a voltage and temperature are measured when a target delay is attained in the semiconductor device. Then, the measured voltage and temperature are shown to a user of the semiconductor device. In this case, the operation range of the semiconductor device is limited in advance but the load impressed on the designer can be reduced.

Also, in the field of the semiconductor device, the saving of a power consumption amount is one of the important problems. As the technique to reduce the power consumption amount in the semiconductor device, DVFS (Dynamic Voltage and Frequency Scaling) and AVS (Adaptive Voltage Scaling) are known.

DVFS is a system in which the power consumption amount is controlled by dynamically switching a voltage and/or a clock frequency in a circuit to be controlled. The voltage and the clock frequency are related to each other and the clock frequency needs to be lowered if the voltage becomes low. Oppositely, if the clock frequency is reduced in a range that the normal operation is guaranteed, the voltage (i.e. a consumed power) can be made low in correspondence to the reduction of the clock frequency. From such a viewpoint, in DVFS, a plurality of combinations of the voltage and the clock frequency in the range that the semiconductor device can operate normally are provided as operation points (modes). By dynamically switching an operation point according to a task, the power consumption amount can be controlled. For example, the techniques relating to DVFS are described in Patent Literature 2 (U.S. Pat. No. 6,943,613) and Patent Literature 3 (U.S. Pat. No. 7,093,143).

AVS is a system in which a supply voltage is adaptively controlled in accordance with a state (load, power and so on) of a circuit to be controlled. For example, the techniques relating to AVS are described in Patent Literature 4 (US 2005/0225376A) and Patent Literature 5 (U.S. Pat. No. 6,967,522).

CITATION LIST

[Patent Literature 1]: JP 2007-258569A
[Patent Literature 2]: U.S. Pat. No. 6,943,613
[Patent Literature 3]: U.S. Pat. No. 7,093,143
[Patent Literature 4]: US2005/0225376A
[Patent Literature 5]: U.S. Pat. No. 6,967,522

SUMMARY OF THE INVENTION

The inventors of the present invention recognized for the first time, the necessity that the voltage control function should be taken into consideration when the semiconductor device with the voltage control function is designed. Also, the inventors recognized the necessity of the semiconductor device suitable for a design technique in which the voltage control function is taken into consideration.

In an aspect of the present invention, a semiconductor device includes: a control target circuit section; and a voltage control section configured to dynamically control a supply voltage to the control target circuit section. The control target circuit section includes: a delay monitor circuit configured to measure a delay in the control target circuit section as a monitor delay; and a target delay register configured to store a target delay data which shows a target delay as a target value of the monitor delay. The delay monitor circuit compares the monitor delay and the target delay shown by the target delay data and sends a comparison resultant signal to the voltage control section to show a result of the comparison. The voltage control section controls the supply voltage based on the comparison resultant signal such that the monitor delay approaches to the target delay.

In another aspect, the present invention relates to a designing method of a semiconductor device which includes a control target circuit section and a voltage control section which dynamically controls a supply voltage to the control target circuit section, wherein the control target circuit section includes: a delay monitor circuit configured to measure a delay in the control target circuit section as a monitor delay; and a target delay register configured to store a target delay data which shows a target delay as a target value of the monitor delay, and wherein the delay monitor circuit compares the monitor delay and the target delay shown by the target delay data and sends a comparison resultant signal to the voltage control section to show a result of the comparison, and the voltage control section controls the supply voltage based on the comparison resultant signal such that the monitor delay approaches to the target delay. The designing method of the semiconductor device is achieved by producing delay libraries in which an inter-chip variation is substantively set to 0; by performing a circuit design of a chip containing the control target circuit section; by performing timing analysis on the chip by using the delay libraries; and by determining the target delay based on the delay library which satisfies the timing constraint.

The present invention is useful to design the semiconductor device with the voltage control function.

BRIEF DESCRIPTION OF THE DRAWINGS

FIG. 4 is a flow chart showing a designing and developing method of the semiconductor device according to the present embodiment;

FIG. 6 is a conceptual diagram showing a correction table in the present embodiment;

DESCRIPTION OF EMBODIMENTS

Hereinafter, a semiconductor device according to the present invention will be described with reference to the attached drawings.

First Embodiment 1-1. Semiconductor Device

Figure 1:
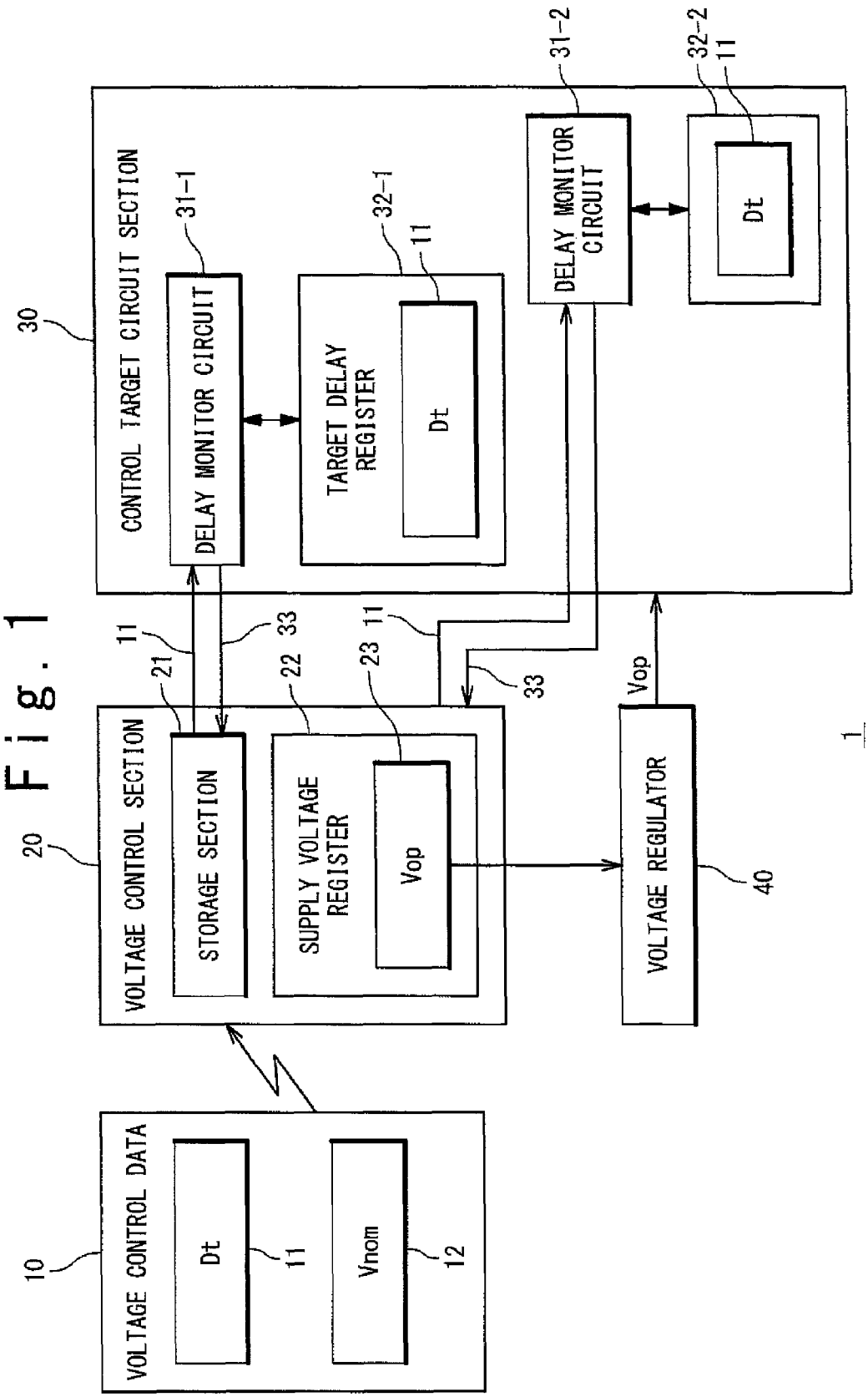
FIG. 1 is a block diagram showing a configuration of a semiconductor device according to a first embodiment of the present invention.

FIG. 1 is a block diagram showing a configuration of a semiconductor device 1 according to a first embodiment of the present invention. The semiconductor device 1 has a voltage control function. Specifically, the semiconductor device 1 is provided with a voltage control section 20, a control target circuit section 30 and a voltage regulator 40. The control target circuit section 30 is a target of the voltage control, and the voltage regulator 40 (voltage output circuit) supplies a supply voltage Vop to the control target circuit section 30, and the voltage control section 20 dynamically controls the supply voltage Vop. It should be noted that in the present embodi-ment, the supply voltage Vop means a power supply voltage and/or a substrate bias voltage.

The voltage control section 20 has a function of PMU (Power Management Unit). The voltage control section 20 is provided with a storage section 21 and a supply voltage register 22. The supply voltage register 22 is a register to store supply voltage data 23 which shows the supply voltage Vop to the control target circuit section 30. The supply voltage data 23 is sent to the voltage regulator 40 (voltage output circuit) and the voltage regulator 40 outputs the supply voltage Vop to the control target circuit section 30 based on the supply voltage data 23. The voltage control section 20 can dynamically control the supply voltage Vop to the control target circuit section 30 by setting and updating the supply voltage data 23.

The control target circuit section 30 is provided with a logic circuit group which is a target of voltage control. Also, the control target circuit section 30 is provided with at least one set of a delay monitor circuit 31 and a target delay register 32. The delay monitor circuit 31 is provided in the control target circuit section 30 to measure a delay on a position of the circuit 31. The delay measured actually by delay monitor circuit 31 is hereinafter referred to a "monitor delay". The target delay register 32 is a register to store a target delay data 11 showing a "target delay Dt". The target delay Dt is a "target value" of the monitor delay obtained by the delay monitor circuit 31. The delay monitor circuit 31 has a function to compare the target delay Dt shown by the target delay data 11 and the monitor delay and to generate a comparison resultant signal 33 which shows a comparison result.

It should be noted that in an example of FIG. 1, a plurality of the delay monitor circuits 31-1 and 31-2 are arranged in different positions in the control target circuit section 30, and the monitor delays in the respective positions are acquired by the delay monitor circuits 31-1 and 31-2. Also, the target delay registers 32-1 and 32-2 are provided for the delay monitor circuits 31-1 and 31-2, respectively. However, the target delay register 32 may be shared by the plurality of the delay monitor circuits 31.

The control target circuit section 30, the voltage control section 20 and the voltage regulators 40 may be all mounted on one chip. Or, the control target circuit section 30 and the voltage control section 20 are mounted on one chip and the voltage regulator 40 may be provided out of the chip. Or, only the control target circuit section 30 is mounted on one chip and the voltage control section 20 and the voltage regulator 40 may be provided out of the chip.

The semiconductor device 1 configured as mentioned above receives the voltage control data 10 from outside and performs adaptive voltage control based on voltage control data 10. The voltage control data 10 contains a target delay data 11 and a nominal voltage data 12 at least. As mentioned above, the target delay data 11 shows the target delay Dt which is a target value of the monitor delay in the delay monitor circuit 31. The nominal voltage data 12 shows a "nominal voltage Vnom". The nominal voltage Vnom is a "design value" of the supply voltage Vop when the target delay Dt is obtained in the delay monitor circuit 31. In other words, in the delay monitor circuit 31 which operates in the nominal voltage Vnom, it is expected from the design that the monitor delay is equal to the target delay Dt. Therefore, the target delay data 11 and the nominal voltage data 12 are related to each other as a set. Such a voltage control data 10 is determined and generated by the designing method of the semiconductor device according to embodiments to be described later.

In an initial stage of the operation, the voltage control section 20 receives the voltage control data 10 from outside and stores the voltage control data 10 in the storage section 21. Also, the voltage control section 20 sends the target delay data 11 to each of the delay monitor circuits 31 in the control target circuit section 30. Each delay monitor circuit 31 stores the received target delay data 11 in the corresponding target delay register 32. Moreover, the voltage control section 20 carries out the initial setting of the supply voltage register 22 by storing the nominal voltage data 12 in the supply voltage register 22 as the supply voltage data 23. In other words, the voltage control section 20 initializes the supply voltage Vop to the nominal voltage Vnom.

In the normal operation, the voltage regulator 40 supplies the supply voltage Vop according to the supply voltage data 23 set to the supply voltage register 22 to the control target circuit section 30. The control target circuit section 30 contains the delay monitor circuit 31 and operates in the supply voltage Vop. Each of the delay monitor circuits 31 in the control target circuit section 30 measures the monitor delay in its position. Also, the delay monitor circuits 31 refers to the target delay register 32 and compares the monitor delay and the target delay Dt shown by the target delay data 11. Then, the delay monitor circuit 31 sends the comparison resultant signal 33 to the voltage control section 20 to indicate the comparison result.

First, the voltage regulator 40 supplies the nominal voltage Vnom to the control target circuit section 30. At this time, in the delay monitor circuit 31, it is expected that the monitor delay is equal to the target delay Dt. However, in actual, the monitor delay often shifts from the target delay Dt because of an inter-chip manufacturing variability and a temperature change. Therefore, the voltage control section 20 carries out the optimal control on the supply voltage Vop based on the comparison resultant signal 33 received from each the delay monitor circuit 31. Specifically, the voltage control section 20 controls the supply voltage Vop such that the monitor delay approaches to the target delay Dt. When the plurality of delay monitor circuits 31 are present, the voltage control section 20 determines the optimal supply voltage Vop as a whole. Then, the voltage control section 20 updates the supply voltage data 23 stored in the supply voltage register 22 to show the supply voltage Vop after the change.

Figure 2:
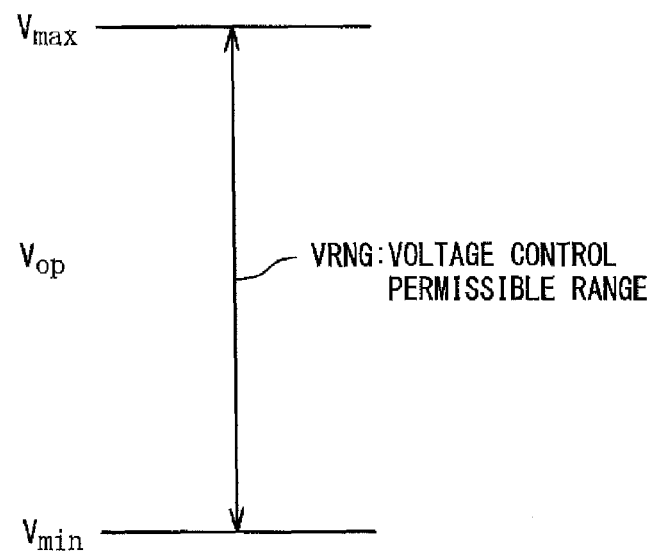
FIG. 2 is a conceptual diagram showing a voltage control permissible range.

As described above, the semiconductor device 1 according to the present embodiment adaptively controls the supply voltage Vop such that the monitor delay in the delay monitor circuit 31 is equal to the target delay Dt. However, the supply voltage Vop cannot be controlled without any limitation. As shown in FIG. 2, the supply voltage Vop can be controlled in a range VRNG from a minimum voltage Vm to a maximum voltage Vmax. The range VRNG is hereinafter referred to as a "voltage control permissible range". The voltage control permissible range VRNG is one of the design constraints which are set in advance in the specification and is referred to in the design of the semiconductor device 1.

Figure 3:
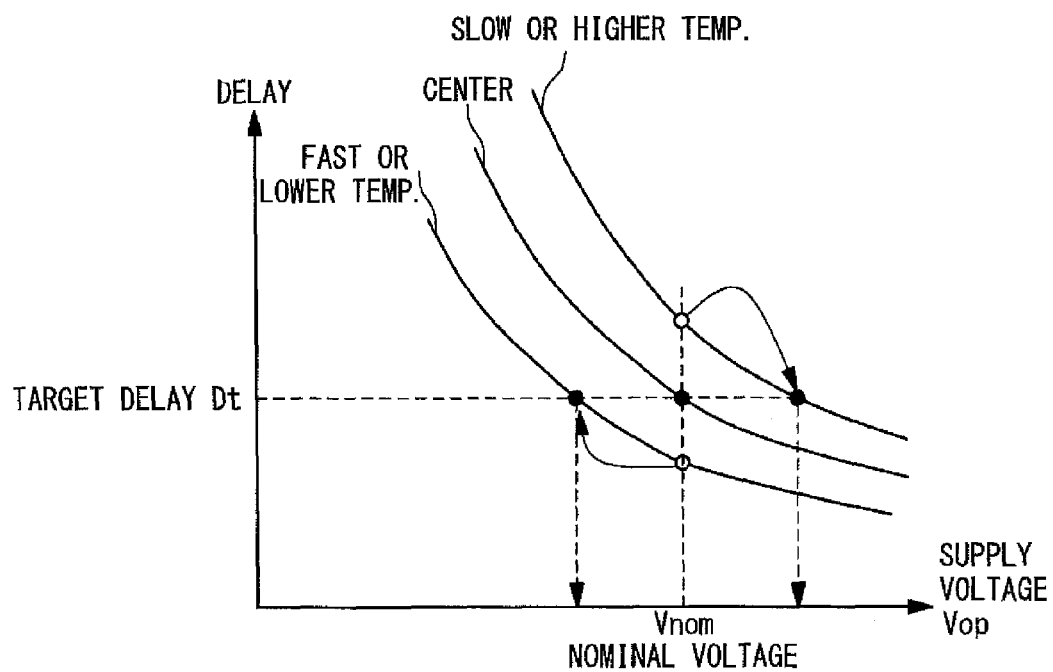
FIG. 3 is a graph schematically showing an adaptive voltage control in the present embodiment.

FIG. 3 is a voltage—delay graph in the present embodiment which schematically shows the adaptive voltage control. There is a negative correlation during the supply voltage Vop and the monitor delay, and as the supply voltage Vop becomes higher, the monitor delay becomes smaller. When the manufacturing variability and the temperature are in a center condition (CENTER), the target delay Dt is obtained to the nominal voltage Vnom. For the chip in which the manufacturing variability is on the side of SLOW rather than the center condition or the temperature is higher than the center condition, the monitor delay to the nominal voltage Vnom becomes larger than the target delay Dt. Therefore, the supply voltage Vop is adjusted to the side higher than the nominal voltage Vnom such that the monitor delay becomes smaller.

On the other hand, for the chip that the manufacturing variability is on the side of FAST rather than the center condition or the temperature is lower than the center condition, the monitor delay to the nominal voltage Vnom is smaller than the target delay Dt. Therefore, the supply voltage Vop is adjusted to the low side rather than the nominal voltage Vnom, such that the monitor delay becomes larger.

In this way, the delay variability due to the inter-chip manufacturing variability and temperature change can be canceled by the adaptive voltage control according to the present embodiment. It should be noted that the cancellation of the delay variability is realized in hardware. Specifically, the delay monitor circuit 31 and the target delay register 32 are embedded in the control target circuit section 30. If the target delay data 11 is stored in the target delay register 32, the supply voltage Vop is automatically controlled such that the target delay Dt is obtained, and as the result, the delay variability is canceled. In other words, if an appropriate target delay Dt is determined in the design stage, the inter-chip delay variability is automatically canceled on the side of the semiconductor device.

1-2. Designing Method

Generally, in the timing analysis (delay analysis) of a designed circuit, a "delay library" is used to provide a center delay value and a corner delay value in a cell. The corner delay value is a delay value in which the "delay variability" due to the manufacturing variability and the temperature change are considered. In other words, in the delay library, a predetermined margin is set, taking the manufacturing variability and a temperature change into consideration. It is verified whether or not a timing constraint is satisfied in even in the worst case, through the timing analysis using such a delay library. When the timing constraint is not satisfied, the design of the circuit is re-tried again. For example, in order to improve a signal drive ability, the increase of the buffer size and the addition of the buffer are carried out. The design is carried out for the circuit to normally operate even in the worst case.

However, it is rare that the delay is in the worst case in the actually manufactured chips. That is, buffers and so on added for the worst case are redundant for most of the chips. Such a redundant circuit increases a circuit area and a power consumption amount. In other words, consideration of only the delay variability in the worst case in the design phase causes unnecessary increase of the circuit area and the power consumption amount in addition to increase of a design period.

As described above, the semiconductor device 1 according to the present embodiment has an adaptive voltage control function and can autonomously cancel the delay variability due to the inter-chip manufacturing variability and the temperature change. If an appropriate target delay Dt is set in the design phase, the delay variability is automatically canceled through the voltage control in the semiconductor device 1. The inventors of the present invention focused attention on at this point, and thought of exclusion of the delay variability from the consideration in the design phase, since the delay variability can be handled in the semiconductor device 1. Thus, the design period is shortened and also the redundant circuit should be able to be prevented. If the redundant circuit is removed, the circuit area and the power consumption amount can be reduced.

The designing method according to the present embodiment is based on the viewpoint described above, and the delay variability which can be handled in the semiconductor device 1 is removed from the consideration, and instead, taking the voltage control function of the semiconductor device 1 into consideration. Moreover, in the designing method according to the present embodiment, the "voltage control data 10" necessary for the voltage control function of the semiconductor device 1 is produced. Hereinafter, the designing method according to the present embodiment will be described in detail.

FIG. 4 is a flow chart showing the designing and developing method of the semiconductor device 1 according to the present embodiment.

Step S100: Production of Basic Design Data

In step S100, delay libraries LIB, a correction table TBL, design constraint data, design margin data and so on are produced which are basic data necessary for a designing process according to the present embodiment. The design constraint data and the design margin data are same as in a general case.

Figure 5A:
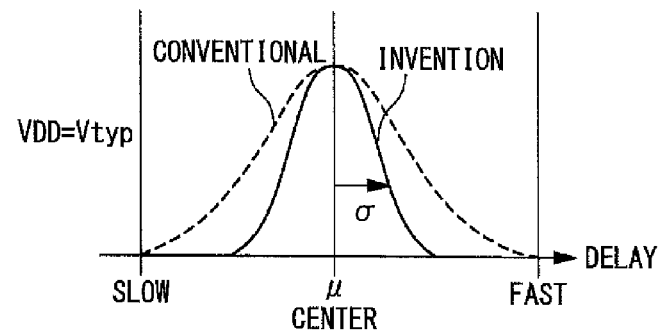
FIGS. 5A to 5C are conceptual diagram showing a delay library in the present embodiment.
Figure 5B:
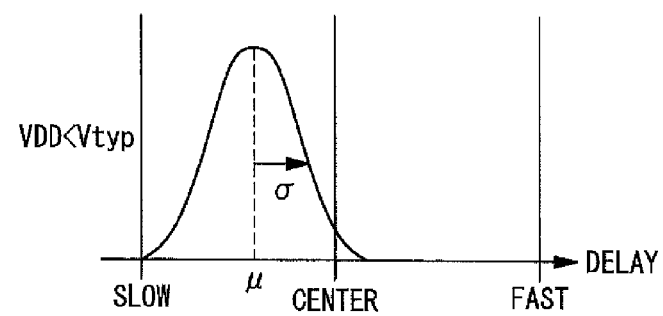
Figure 5C:
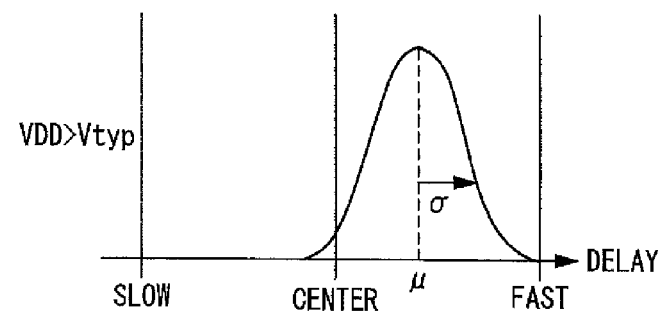

FIGS. 5A to 5C conceptually show the delay libraries LIB in the present embodiment. For comparison, a conventional delay library is shown by a broken line. A delay distribution given by the delay library is defined by the nominal delay value (average value) $\mu$ and the delay variability (standard deviation) $\sigma$ from the nominal delay value $\mu$. Generally, the delay variability 6 which is considered in the delay library is expressed by the following equation (1).

$$\sigma \sqrt{\sigma_{d2d}^2 + \sigma_{wid}^2 + \sigma_{cntl}^2} \quad (1)$$

Here, $\sigma_{d2d}$ is an "inter-chip variability", $\sigma_{wid}$ is an "in-chip variability" and $\sigma_{cntl}$ is a "variation due to a control system". According to the present embodiment, as described above, the delay variability which can be handled in the semiconductor device 1 is excluded from the consideration. Specifically, the inter-chip variability $\sigma_{d2d}$ is excluded from the consideration and is substantively set to "0".

$$\sigma_{d2d} \approx 0 \quad (2)$$

As the result, the delay variability which is to be considered in the delay libraries LIB in the present embodiment becomes smaller than that of the conventional delay library. As shown in FIGS. 5A to 5C, the delay distribution (solid line) in the present embodiment becomes narrower than the conventional delay distribution (broken line). In other words, the delay libraries LIB in the present embodiment becomes "tighter" than the conventional delay library.

Such delay libraries LIB are produced to various conditions (supply voltage and temperature). Three kinds of delay libraries LIB are shown in FIGS. 5A to 5C in correspondence to three kinds of power supply voltages VDD. When the power supply voltage VDD is lower than a reference voltage Vtyp (VDD<Vtyp), a delay distribution shifts to a side of SLOW. On the other hand, when the power supply voltage VDD is higher than the reference voltage Vtyp (VDD>Vtyp), the delay distribution shifts to a side of FAST. It should be noted that a plurality of kinds of voltages are contained in the voltage control permissible range VRNG shown in FIG. 2, and the plurality of kinds of delay libraries LIE corresponding to the plurality of kinds of voltages are generated.

FIG. 6 shows a correction table TEL in the present embodiment. The correction table TEL is a table which approximately shows a correlation between the voltage and the delay. In detail, the correction table TBL shows correspondence relation between a delay correction coefficient $\alpha$ and a voltage correction coefficient. There is negative correlation between the voltage and the delay (FIG. 3). When the delay must be made smaller, the voltage must be increased according to it. Oppositely, when it is permitted to make the delay larger, the voltage can be dropped. It is possible to say that the correction table TBL shows a correction magnification of each of the delay and the voltage "approximately". A method of using the correction table TBL will be described later in detail.

Step S200: Circuit Design

In step S200, a circuit design of the chip is carried out. The designed chip contains the control target circuit section 30 at least. A technique of the circuit design is the same as that of a conventional technique. A net list of the designed circuit is produced through logic synthesis, and a layout data of the designed circuit is produced through layout design.

At the time, because a redundant circuit is eliminated by carrying out a design by use of a "tight" delay libraries LIB shown in FIGS. 5A to 5C, a circuit area and a power consumption amount are reduced. However, it is not always necessary to use the "tight" delay library LIB. When it is not possible to satisfy a design constraint on timing in the design phase, an error is generated in the timing analysis to be described later and it becomes necessary to perform the steps from the circuit design again (step S200). In order to avoid the return to the circuit design, a usual delay library or a delay library LIB having a wider variability margin than the "tight" delay library shown in FIGS. 5A to 5C although it is tighter than the usual delay library can be used.

Step S300: Constraint Analysis

In step S300, a constraint analysis is carried out by using the net list, the layout data, the design constraint, the delay libraries LIB and so on. The constraint analysis contains DRC (Design Rule Check) and the timing analysis.

In the timing analysis, the "tight" delay library LIB shown in FIGS. 5A to 5C is used. Therefore, a design period becomes shorter than in the case where the usual delay library is used, and also the redundant circuit is prevented. Because the redundant circuit is excluded, the circuit area and the power consumption amount are reduced.

Also, an optimal delay library LIB which satisfies the timing constraint is selected. Then, a combination of the target delay Dt and the nominal voltage Vnom is determined based on the selected delay library LIB and the above-mentioned voltage control data 10 (target delay data 11, and nominal voltage data 12) is produced. Here, the nominal voltage Vnom is a voltage corresponding to the selected delay library LIB. Also, the target delay Dt in the delay monitor circuit 31 is calculated based on the nominal delay value $\mu$ of the selected LIB delay library. It should be noted that when there is not a delay library LIB which satisfies the timing constraint, the circuit design (step S200) may be carried out again after the design constraint is appropriately changed. The details of step S300 are described later.

Step S400: Manufacture

In step S400, the chip that the design has been completed is manufactured. Also, the semiconductor device 1 according to the present embodiment is assembled.

Step S500: Test

In step S500, an operation test of the semiconductor device 1 is carried out.

Step S600: Actual Operation

The semiconductor device 1 operates as described in the above-mentioned 1-1.

1-3. Constraint Analysis

Figure 7:
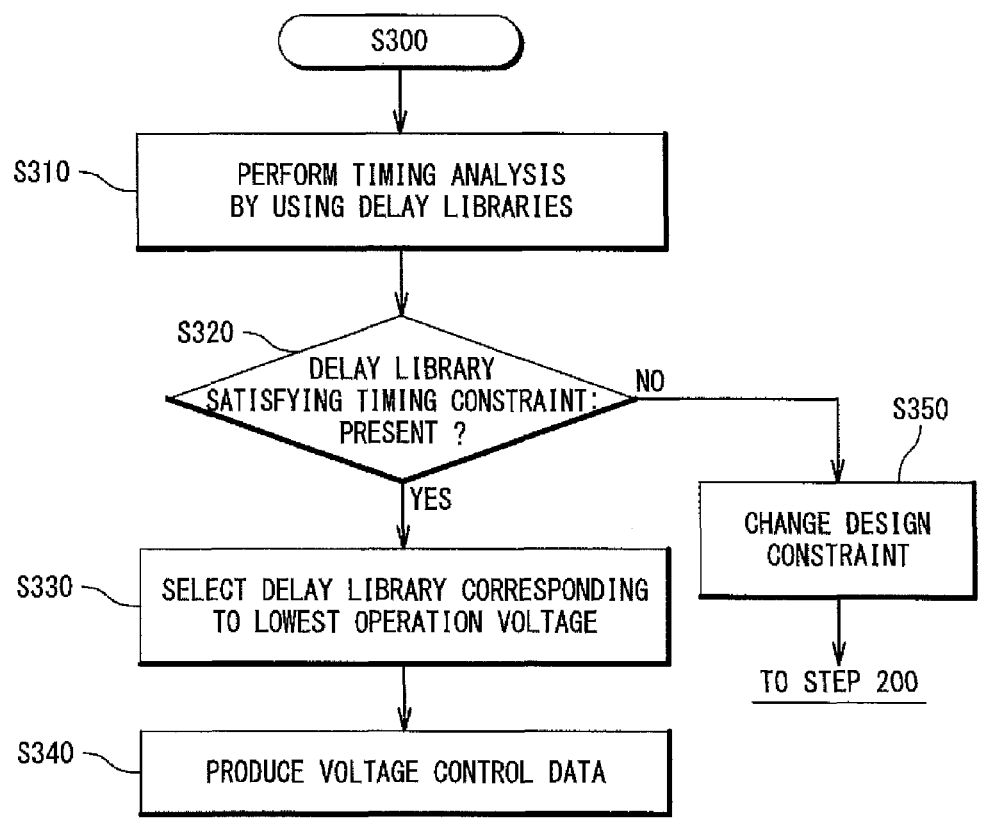
FIG. 7 is a flow chart showing a constraint analysis in the present embodiment.

Next, the constraint analysis (step S300) according to the present embodiment will be described in detail. FIG. 7 is a flow chart showing a constraint analysis (step S300) in the present embodiment.

Figure 8:
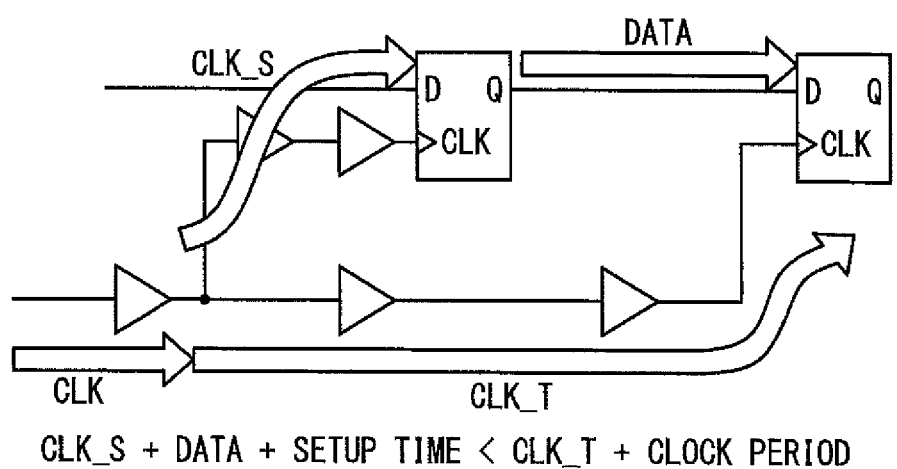
FIG. 8 is a conceptual diagram showing a timing analysis.

Step S310:

By using the delay library LIB, the timing analysis is carried out. The timing analysis in this step is STA (Static Timing Analysis) or statistics STA. FIG. 8 is a diagram showing a condition (timing constraint) to satisfy a desired operation frequency for the circuit. The condition is generally shown by the following equation (3).

$$CLK\_S+DATA+[SetupTime]<CLK\_T+[Clock\ Cycle] \quad (3)$$

Steps S320 to S340:

When one of the plurality of kinds of delay libraries LIB satisfies the timing constraint (step S320; Yes), the following process is executed. That is, the optimal one of the delay libraries LIB which satisfies the timing constraint is selected (Step S330). Specifically, the delay library LIB corresponding to the lowest voltage (the largest nominal delay value μ) in the range in which the timing constraint is satisfied is selected. Then, a combination of the target delay Dt and the nominal voltage Vnom is determined based on the selected delay library LIB and the voltage control data 10 is produced (Step S340). Here, the nominal voltage Vnom is a voltage corresponding to the selected delay library LIB. Also, the target delay Dt in the delay monitor circuit 31 is calculated based on the nominal delay value μ of the selected delay library LIB.

In this way, in the present embodiment, the largest target delay Dt (the lowest nominal voltage Vnom) is selected in the range in which the timing constraint is satisfied. Especially, in the timing analysis, the larger target delay Dt (the lower nominal voltage Vnom) can be selected as compared with a case where the usual delay library is used, since the tight delay library LIB is used. In other words, a design margin is reduced for the delay variability capable of being handled in the semiconductor device 1 and it is possible to efficiently reduce the nominal voltage Vnom. As a result, a wasteful power consumption amount is reduced. According to the present embodiment, the efficient power saving design becomes possible.

Step S350:

On the other hand, when there is no one of the plurality of kind of delay libraries LIB which satisfies the timing constraint (step S320; No), the design constraint is changed (Step S350). Specifically, the design constraint relating to the clock period (the operation frequency) is changed based on the result of the timing analysis. Then, the control flow returns to the circuit design (step S200).

Figure 9:
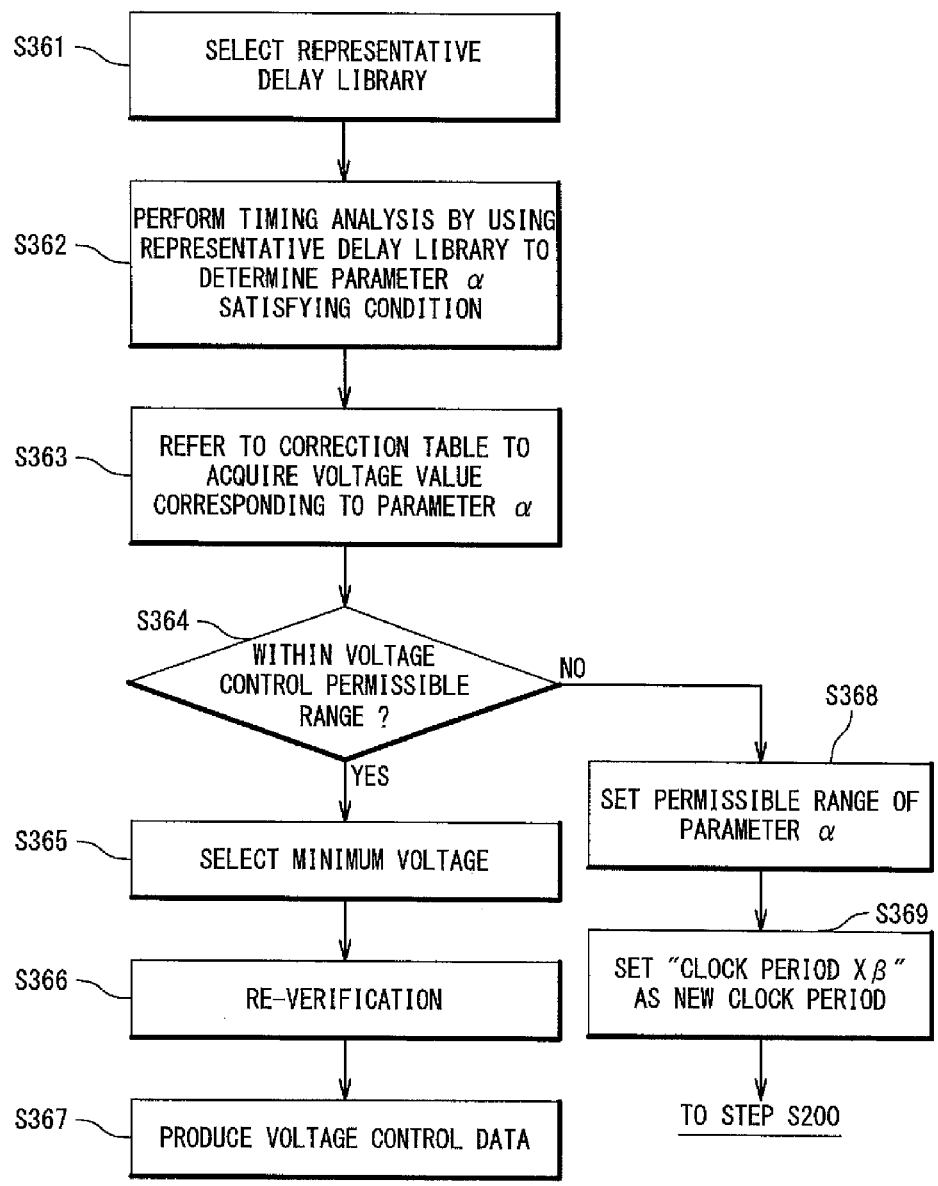
FIG. 9 is a flow chart showing a constraint analysis in the present embodiment.

In order to realize the above constraint analysis, it could be considered to sequentially use all the delay libraries LIB to perform the timing analysis repeatedly. On the other hand, in order to reduce a processing time, the simple and equivalent technique as described next may be adopted. Referring to FIG. 9, the simple and equivalent technique will be described.

Step S361:

First, one typical delay library LIB is selected. For example, the delay library LIB corresponding to the reference voltage Vtyp (FIG. 5) is selected.

Step S362:

By using the delay library LIB selected in step S361, the timing analysis is carried out. As the condition (the timing constraint) for the circuit to satisfy the desired operation frequency, the following equation (4) is used instead of the above equation (3).

$$(CLK\_S+DATA)\times\alpha+[SetupTime]<CLK\_T\times\alpha+[Clock\ Cycle] \quad (4)$$

In the equation (4), a delay value is corrected by using a parameter α. The parameter α is the delay correction coefficient α appearing in the correction table TBL shown in FIG. 6. Through the timing analysis using a representative delay library LIB, it is possible to calculate a range of the delay correction coefficient α which satisfies the above equation (4). It should be noted that although being expressed by one parameter α, there is a case that a delay change rate to a voltage change depends on a kind of a cell of a circuit. In this case, another parameter α, can be set every each cell. The procedure at this time will be described later.

Step S363:

By referring to the correction table TBL shown in FIG. 6, the range of the voltage correction coefficient corresponding to the range of the delay correction coefficient α obtained in step S362 is determined. It should be noted that in the correction table TBL shown in FIG. 6, a margin is added to the voltage correction coefficient in consideration of an approximate process of this method. Next, the voltage range in which the above equation (4) is satisfied is calculated by multiplying the voltage of the representative delay library LIB (i.e. reference voltage Vtyp) by the range of the voltage correction coefficient.

Steps S364 to S367:

When at least a part of the voltage range obtained in step S363 is in the voltage control permissible range VRNG (step S364; Yes), this means that there is any delay library LIB which satisfies the timing constraint (FIG. 7 and step S320; Yes). Therefore, the lowest voltage is selected in the voltage range, like the above step S330 (Step S365). That is, the lowest voltage (the largest α) is selected in the range in which the timing constraint is satisfied. Thus, the power consumption amount is reduced at maximum. Even if the lowest voltage selected is higher than the reference voltage Vtyp, it means that the increase of the power consumption amount is suppressed to a minimum.

By using the delay library LIB corresponding to the lowest voltage selected in step S365 (or, by interpolating the delay library LIB approximate to it), since this method is approximate, the timing analysis is carried out once again (Step S366). A conditional equation in this case may be the equation (3). When it is confirmed that the timing constraint is satisfied, the voltage control data 10 is produced (Step S367). Here, the nominal voltage Vnom is the lowest voltage selected in step S365. Also, the target delay Dt in the delay monitor circuit 31 is calculated based on the nominal delay value μ of the delay library LIB corresponding to the lowest voltage.

Steps S368 to S369:

On the other hand, when the voltage range obtained in step S363 is the outside of voltage control permissible range VRNG (step S364; No), it means that the timing constraint is not satisfied even if the maximum Vmax of voltage control permissible range VRNG is used. This is equivalent to no existence of the delay library LIB which satisfies the timing constraint (see FIG. 7, step S320; No). In this case, the design constraint which relates to the clock period (the operation frequency) is changed, like the above step S350.

Specifically, first, a permission value α' of the delay correction coefficient α is set (Step S368). The permission value α' is set to the delay correction coefficient α corresponding to an optional voltage in the voltage control permissible range VRNG. The permission value α' may be set to the delay correction coefficient α corresponding to the maximum voltage Vmax in which timing is improved to maximum. Next, the following conditional equation (5) which contains the permission value α' and a parameter β is considered.

$$(CLK\_S+DATA)\times\alpha'+[SetupTime]<CLK\_T\times\alpha'+[ClockCycle]\times\beta \quad (5)$$

The parameter β is calculated to meet the conditional equation (5). That is, to satisfy the timing constraint, the change of the clock period as well as the voltage control is considered. In other words, the remainder portion of the timing constraint other than a portion which can not be achieved by the voltage control is achieved by the change of the clock period. When the parameter β which meets the conditional equation (5) is calculated, the "clock period×β" is written in the design constraint as a "new clock period" (Step S369). In this way, the design constraint relating to the clock period (operation frequency) is updated. After that, the control flow returns to the circuit design (step S200).

1-4. Effect

The semiconductor device 1 according to the present embodiment has the adaptive voltage control function and the delay variability due to the inter-chip manufacturing variability and a temperature change can be autonomously cancelled. Therefore, in the design phase, the voltage control function is considered and the delay variability which can be handled by the semiconductor device 1 is excluded from the consideration. Specifically, in a case of the timing analysis, a "tighter" delay library LIB than in a general case is used. Thus, the design period is shortened and it is possible to prevent a redundant circuit. Because the redundant circuit is removed, the circuit area and the power consumption amount are reduced.

The target delay Dt and the nominal voltage Vnom necessary for the voltage control function of the semiconductor device 1 are determined in the above design phase. At this time, in the present embodiment, the largest target delay Dt (the lowest nominal voltage Vnom) is selected in the range in which the timing constraint is satisfied. Especially, in the timing analysis, the larger target delay Dt (the lower nominal voltage Vnom) can be selected as compared with a case where a usual delay library is used, since a tight delay library LIB is used. In other words, the design margin is reduced for a portion which can be handled in the semiconductor device 1 and it is possible to efficiently reduce the nominal voltage Vnom. As a result, the wasteful power consumption amount is reduced. According to the present embodiment, it is possible to carry out the efficient power saving design.

Also, the semiconductor device 1 according to the present embodiment is provided with the delay monitor circuit 31 and the target delay register 32. The target delay data 11 is stored in the target delay register 32 to show the target delay Dt determined in the above design technique. Then, the supply voltage Vop is automatically controlled so that the target delay Dt can be obtained in the delay monitor circuit 31. Such a circuit configuration is suitable for the power saving design technique according to the present embodiment.

Second Embodiment

Figure 10:
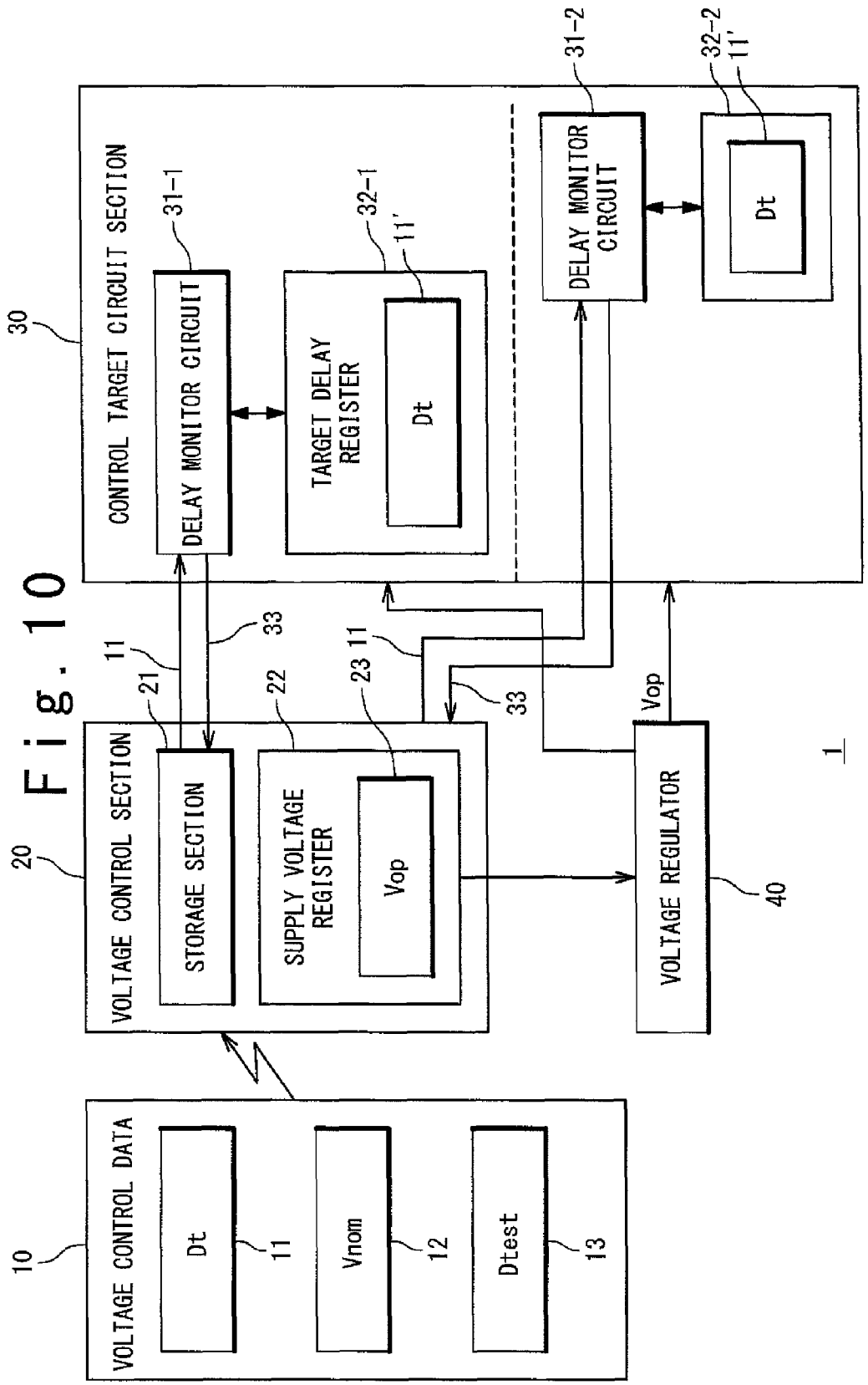
FIG. 10 is a block diagram showing the configuration of the semiconductor device according to a second embodiment of the present invention.

FIG. 10 is a block diagram showing the configuration of the semiconductor device 1 according to a second embodiment of the present invention. The description of a portion of the second embodiment which overlaps that of the first embodiment is appropriately omitted. The voltage control data 10 further includes a test delay data 13 which shows "test delay Dtest" in the present embodiment. The test delay Dtest is an expectation of the monitor delay under the condition (voltage and temperature) at the test time (FIG. 4, step S500) of the semiconductor device 1. The test delay data 13 is produced in the design phase.

Before the test (step S500), the voltage control section 20 receives the voltage control data 10 from outside and stores the voltage control data 10 in the storage section 21. Moreover, the voltage control section 20 may send the target delay data 11 and the test delay data 13 to each delay monitor circuit 31 in the control target circuit section 30.

At the test time (step S500), each delay monitor circuit 31 measures the monitor delay under a test condition. Each delay monitor circuit 31 may send the measured monitor delay to the voltage control section 20. The voltage control section 20 or the control target circuit section 30 (delay monitor circuit 31) calculates the difference between the monitor delay and the test delay Dtest in each delay monitor circuit 31 and the target delay Dt is corrected based on the difference. In other words, this preliminary correction of the target delay Dt is carried out in the test step before the normal operation. The preliminary correction of the target delay Dt is carried out independently to each of the plurality of delay monitor circuits 31 in the control target circuit section 30. Thus, the delay change due to the manufacturing variability is corrected in advance, and it is sufficient to correct the delay change depending on the environmental condition such as temperature in the normal operation, which can make it possible to perform correction at higher speed. Also, a region of the control target circuit section 30 is divided into blocks respectively corresponding to the delay monitor circuits 31, and an optimal voltage Vop may be supplied to each block. In this case, a component, which is dependent on an in-chip position, of the delay variability $\sigma_{wid}$ is canceled. The target delay data 11' which indicates the target delay Dt after the correction is stored in the target delay register 32 and then the target delay Dt after the correction is used. It should be noted that the data indicating the above difference (the correction) is stored in the storage section 21 of the voltage control section 20 and may be appropriately used.

According to the present embodiment, in the test phase, the preliminary correction of the target delay Dt is carried out. Thus, it is possible to perform the correction in the normal operation at high speed. Also, a part of the in-chip delay variability $\sigma_{wid}$ can be canceled. In this case, in the design phase, a part of the in-chip variability $\sigma_{wid}$ in addition to the inter-chip variability $\sigma_{d2d}$ can be excluded from the consideration. That is, the delay library LIB can be more made tight. Thus, the circuit area and the power consumption amount can be further reduced.

Third Embodiment

In a third embodiment of the present invention, DVFS (Dynamic Voltage and Frequency Scaling) is applied to the first embodiment. In DVFS, a plurality of combinations of the nominal voltage Vnom and the clock frequency are provided and these combinations are provided as the plurality of operation points (modes).

Figure 11:
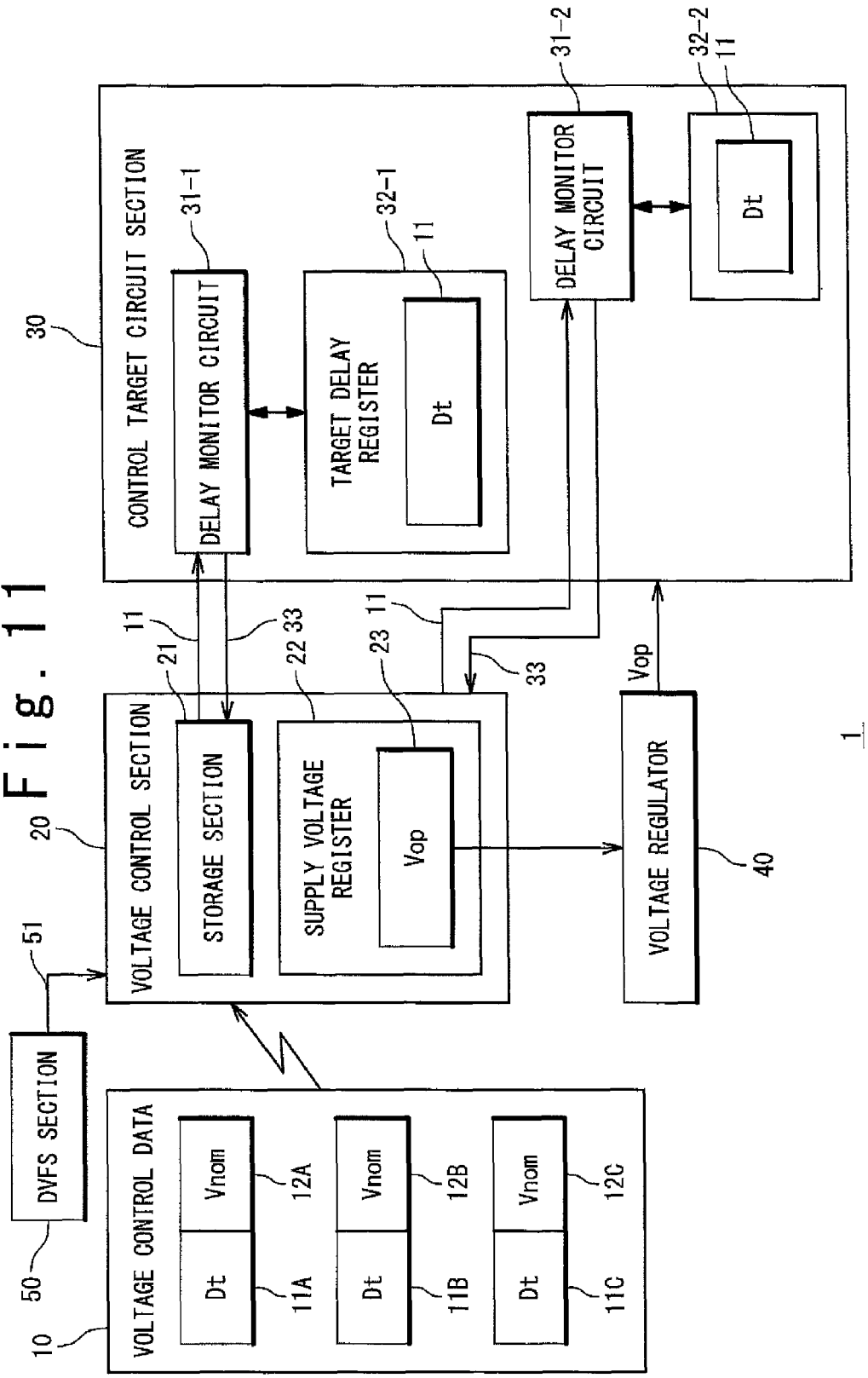
FIG. 11 is a block diagram showing the configuration of the semiconductor device according to a third embodiment of the present invention.

FIG. 11 is a block diagram showing the configuration of the semiconductor device 1 according to the third embodiment. The description of a portion which overlaps that of the first embodiment is appropriately omitted. Moreover, the semiconductor device 1 according to the present embodiment is provided with a DVFS section 50 in addition to the configuration in the first embodiment. The DVFS section 50 sends a mode specification signal 51 to the voltage control section 20 to specify one of the plurality of different modes of voltages or clock frequencies.

The voltage control data 10 has a combination of the target delay data 11 and the nominal voltage data 12 for each of the plurality of modes of DVFS. For example, in FIG. 11, a combination of the target delay data 11A and the nominal voltage data 12A is for a mode A, a combination of the target delay data 11B and the nominal voltage data 12B is for a mode B. A combination of the target delay data 11C and the nominal voltage data 12C is for a mode C. An optimal combination of the target delay Dt and the nominal voltage Vnom for each mode can be determined based on the clock frequency specified in the mode, like the first embodiment. It should be noted that when the voltage is specified based on DVFS, the voltage is used as the nominal voltage Vnom.

The voltage control section 20 receives the voltage control data 10 from outside and stores the voltage control data 10 in the storage section 21. Moreover, the voltage control section 20 receives the mode specification signal 51 from the DVFS section 50 and selects a combination of the target delay data 11 and the nominal voltage data 12 for the specified mode. Then, the voltage control section 20 sends the selected target delay data 11 to each delay monitor circuit 31 and also stores the selected nominal voltage data 12 in the supply voltage register 22 as the supply voltage data 23. When the mode is changed by the DVFS section 50, the voltage control section 20 selects the target delay data 11 and the nominal voltage data 12 based on a new mode and changes the target delay Dt and the nominal voltage Vnom. In this way, DVFS can be incorporated in the present invention.

Fourth Embodiment

The precision of delay adjustment by the voltage control function of the semiconductor device 1 depends on the number and distribution of the delay monitor circuits 31 which are embedded in the control target circuit section 30. For example, when the delay monitor circuit 31 exists by only one in the control target circuit section 30, there is a possibility that an error from a desired delay value becomes large on a signal path far from the delay monitor circuit 31. Therefore, in the fourth embodiment, a design margin of the delay adjustment error is considered in the timing analysis of the design cycle (steps S310 and S362).

Figure 12:
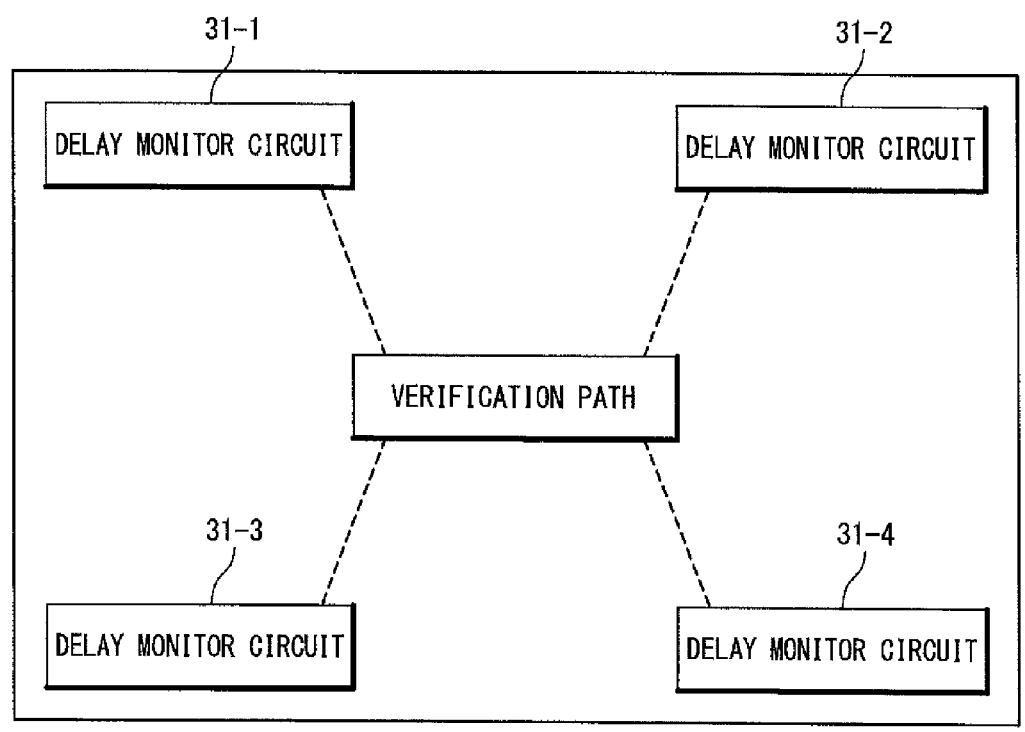
FIG. 12 is a diagram schematically showing a fourth embodiment of the present invention.

FIG. 12 is a diagram schematically showing the timing analysis in the present embodiment. One of parameters which contribute to the delay adjustment error is the number of delay monitor circuits 31 in the control target circuit section 30. It is expected that the delay adjustment error becomes larger as the number of delay monitor circuits 31 becomes less. Therefore, as the number of delay monitor circuits 31 becomes less, the design margin is set larger.

Also, the other parameter which contributes to the delay adjustment error is the nearest distance between the signal pass and the delay monitor circuit 31. It is expected that the delay adjustment error becomes larger as the distance becomes longer. Therefore, as the distance between the verification path and the delay monitor circuit 31 in the timing analysis becomes longer, the design margin to the verification path is set larger. It should be noted that the design margin depending on the distance must be considered every verification path in the timing analysis.

Figures 13, 14:
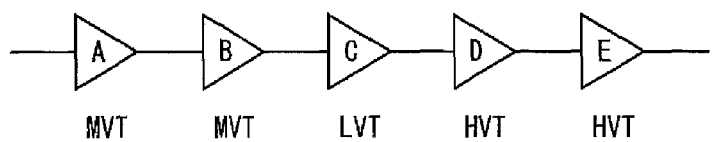
FIG. 13 is a conceptual diagram showing a margin revision table in the fourth embodiment.
FIG. 14 is a diagram schematically showing a fifth embodiment of the present invention.

FIG. 13 shows an example of a margin correction table MGN which gives a margin coefficient γ when the above two parameters (number and distance) are both considered. The margin coefficient γ become smaller as the number of delay monitor circuits 31 increases more, and the margin coefficient γ become larger as the number of delay monitor circuits 31 increases less. Also, the margin coefficient γ become larger as the distance becomes longer, and the margin coefficient γ become smaller as the distance becomes shorter. The margin coefficient γ is incorporated into the conditional equation for the timing analysis as shown in the following equation (6).

$$\{(CLK\_S+DATA)\times\alpha+[SetupTime]\}\times(1+\gamma)<\{CLK\_T\times\alpha'+[ClockCycle]\}\times(1-\gamma) \quad (6)$$

In the timing analysis, the conditional equation (6) is used. When the distance should be considered, the different margin coefficient γ is used every verification path. It should be noted that in the above example, the two parameters (number and distance) are considered but the present invention is not limited to it. However, it is desirable that the number of delay monitor circuits 31 is considered at least.

Fifth Embodiment

As shown in FIG. 14, a plurality of kinds of cells in which the threshold voltages (Vt) of the transistors are different are mixed in the logic circuit (LVT: Low Vt, MVT: Middle Vt, and HVT: High Vt). This is to restrain a leakage current in the logic circuit. However, among the transistors with different threshold voltages Vt, the delay change rates to the voltage fluctuation are different from each other. Therefore, in the fifth embodiment, the delay correction coefficient α is provided for every threshold voltage Vt.

Figures 15, 16:
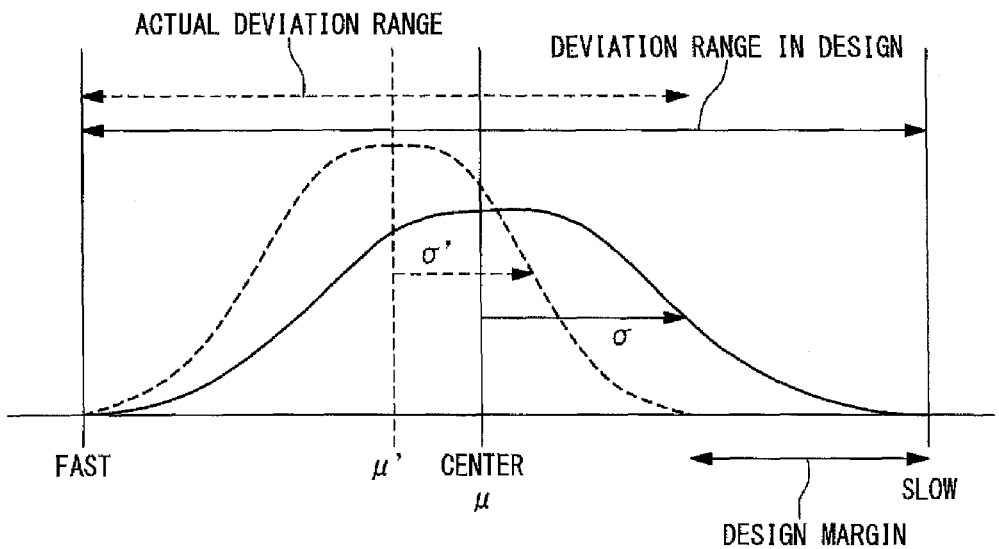
FIG. 15 is a conceptual diagram showing a correction table in the fifth embodiment.
FIG. 16 is a conceptual diagram showing a sixth embodiment of the present invention.

FIG. 15 shows an example of the correction table TBL used in the present embodiment. As shown in FIG. 15, three kinds of delay correction coefficients αH, αM, and αL are provided for one voltage correction coefficient. The delay correction coefficient αL is applied to the low Vt cell, the delay correction coefficient αM is applied to the middle Vt cell, and the delay correction coefficient αH is applied to the high Vt cell. In the timing analysis, the correction table TBL shown in FIG. 15 is referred to. Thus, the precision of the timing analysis is improved.

It should be noted that a cell with the different threshold voltage has been described as a case that the delay change rate to the voltage fluctuation is different. However, when there is a cell with the different voltage change rate which depends on various factors in addition to the cell with the different threshold voltage, it would be understood that the same method as described above can be applied.

Sixth Embodiment

In many cases, the delay libraries are designed at the initial stage of the process development, and then the same delay libraries continue to be used. However, a manufacturing process is always improved and the manufacturing variability is improved with time. Therefore, as shown in FIG. 16, there is a case that the nominal delay value μ' and the delay variability σ' are smaller in actual, as compared with the nominal delay value μ and the delay variability σ in the library design. In this case, the difference between the values at the time of the library design and the values at the time of manufacturing is a redundant design margin, which increases a design cost. However, it needs many working steps to re-generate the delay library every time the manufacturing process is improved, which is not realistic. Therefore, in the sixth embodiment of the present invention, the following process is proposed.

First, a delay is measured by using a ring oscillator and so on incorporated in a product and an actual delay database is generated. Next, a delay distribution obtained from the actual delay database and the delay distribution obtained from the delay library are compared and a difference between both is calculated. Then, the nominal voltage Vnom and the target delay Dt are corrected based on the difference.

Specifically, a statistical delay parameter (μ+σ) is calculated based on the delay library. Also, a statistical delay parameter (μ'+σ') is calculated based on the actual delay database. Then, the delay correction coefficient α is calculated to satisfy the following equation (7).

$$(\mu'+\sigma') \times \alpha = (\mu+\sigma) \quad (7)$$

Next, by referring to the correction table TEL, the voltage correction coefficient corresponding to the calculated delay correction coefficient α is determined. The nominal voltage Vnom is corrected (reduced) based on the voltage correction coefficient. Then, a new nominal voltage data 12 which shows the nominal voltage Vnom after the correction and a new target delay data 11 corresponding to it are generated and are supplied to the semiconductor device 1. In this way, the voltage can be made further lower while maintaining the operation performance of the circuit. That is, the voltage control according to the improvement of the manufacturing process is made possible.

It should be noted that any combination among the above-mentioned embodiments is permissible.

[Design System]

Figure 17:
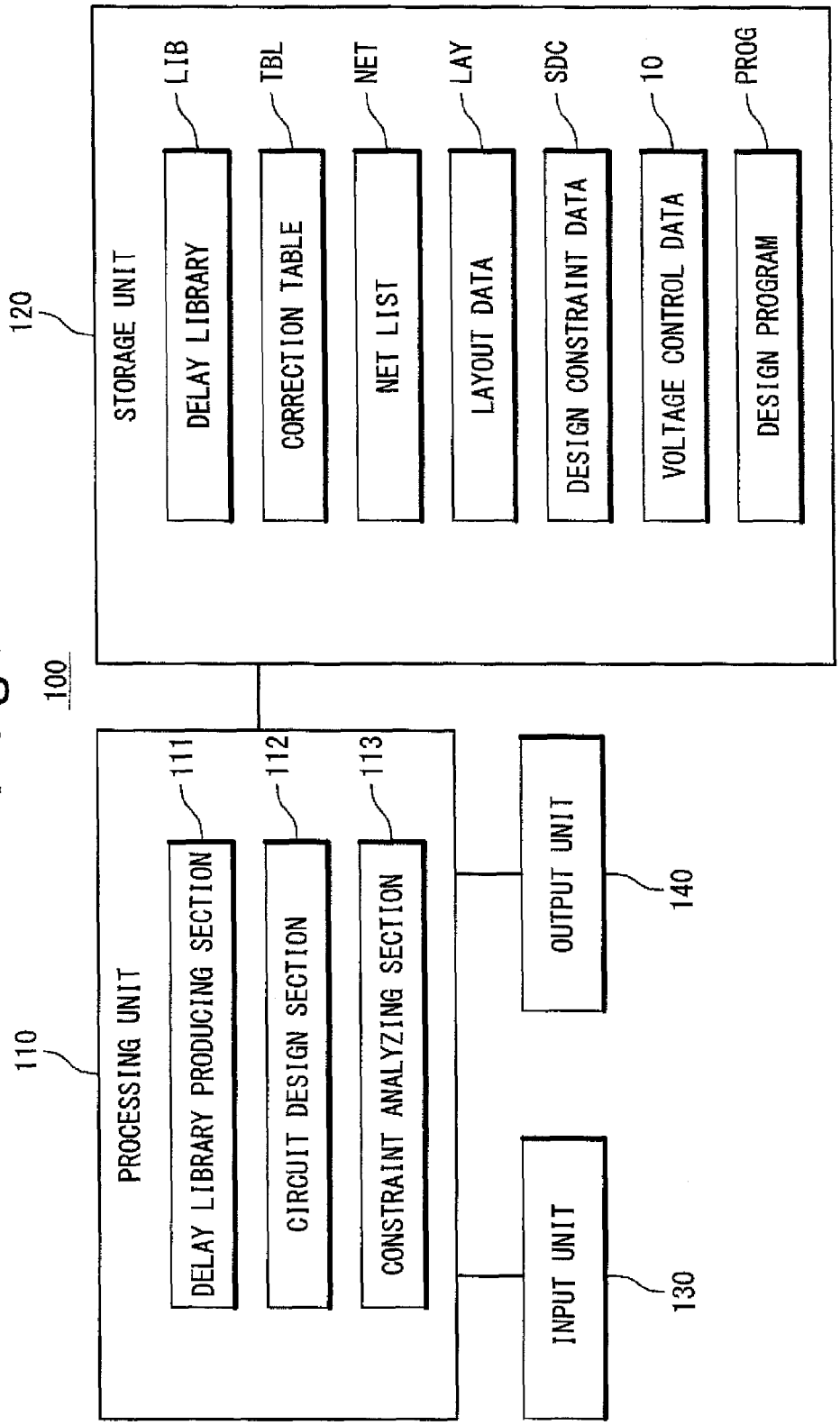
FIG. 17 is a block diagram showing a design system according to an embodiment of the present invention.

The design technique according to the present invention can be realized by a computer-aided design system. FIG. 17 is a block diagram showing an example of design system 100. The design system 100 is provided with a processing unit 110, a storage unit 120, an input unit 130 and an output unit 140. A CPU is exemplified as the processing unit 110. RAM and a hard disk drive are exemplified as the storage unit 120. A keyboard and a mouse are exemplified as the input unit 130. A display is exemplified as the output unit 140.

The delay library LIB, the correction table TEL, the net list NET, the layout data LAY, the design constraint data SDC, the voltage control data 10, a design program PROG, and so on are stored in the storage unit 120.

The design program PROG is a computer program which is executed by the processing unit 110. The design program PROG may be recorded in a computer-readable storage tangible medium. The processing unit 110 realizes the design process of the semiconductor device by executing the design program PROG. Specifically, the processing unit 110 is provided with a delay library producing section 111, a circuit design section 112 and a constraint analyzing section 113 as the functional blocks. These functional blocks are realized through cooperation of processing unit 110 and the design program PROG.

The delay library producing section 111 performs the above-mentioned step S100 and produces the delay library LIB. The circuit design section 112 performs the above-mentioned step S200 and produces the net list NET and the layout data LAY. The constraint analyzing section 113 performs the above-mentioned step S300 by using the delay library LIB, the correction table TBL, the net list NET, the layout data LAY, the design constraint data SDC and so on. In this way, the constraint analyzing section 113 produces the voltage control data 10 which is provided for the semiconductor device 1.

As described above, the embodiments of the present invention have been described by referring to the attached drawings. Here, the present invention is not limited to the above-mentioned embodiments and can be appropriately modified by a skilled person in the art in the range which does not deviate from the spirit of the present invention.

What is claimed is:

1. A semiconductor device comprising:
    a control target circuit section; and
    a voltage control section configured to dynamically control a supply voltage to said control target circuit section,
    wherein said control target circuit section comprises:
        a delay monitor circuit configured to measure a delay in said control target circuit section as a monitor delay; and
        a target delay register configured to store target delay data for a target delay as a target value of said monitor delay and which is set before the measuring of the delay, based on an external signal,
    wherein said delay monitor circuit compares said monitor delay and said target delay and sends a comparison resultant signal to said voltage control section to show a result of the comparison, and
    wherein said voltage control section controls said supply voltage based on said comparison resultant signal such that said monitor delay approaches to said target delay.

2. The semiconductor device according to claim 1, further comprising a voltage output circuit,
    wherein said voltage control section comprises a supply voltage register configured to store supply voltage data for said supply voltage, and
    wherein said voltage control section controls said supply voltage by updating said supply voltage data, and
    said voltage output circuit outputs said supply voltage determined based on said supply voltage data to said control target circuit.

3. The semiconductor device according to claim 2, wherein said voltage control section receives voltage control data externally,
    wherein said voltage control data includes said target delay data, and a nominal voltage data for a nominal voltage as a design value of said supply voltage when said target delay is obtained,
    wherein said target delay data and said nominal voltage data are related to each other,
    wherein said voltage control section sends said target delay data to said control target circuit section, and said control target circuit section stores said target delay data in said target delay register, and
    wherein said voltage control section performs an initial setting of said supply voltage register by using said nominal voltage data as said supply voltage data.

4. The semiconductor device according to claim 3, wherein said voltage control data contains a test delay data for a test delay which comprises an expectation of said monitor delay under a condition of a test of said semiconductor device,
    wherein said delay monitor circuit measures said monitor delay in said test before a normal operation,
    wherein at least one of said control target circuit section and said voltage control section corrects said target delay based on a difference between said monitor delay and said test delay of said test delay data, and
    wherein said target delay after said correction is used in the normal operation.

5. The semiconductor device according to claim 4, wherein a plurality of said delay monitor circuits are provided in said control target circuit section,
    wherein each of said plurality of delay monitor circuits measures said monitor delay in a position corresponding to said delay monitor circuit in said control target circuit section, and
    wherein a correction of said target delay is carried out separately to each delay monitor circuit of said plurality of delay monitor circuits.

6. The semiconductor device according to claim 3, further comprising:
   a DVFS (Dynamic Voltage and Frequency Scaling) section configured to specify one of a plurality of modes of a voltage or a clock frequency mode which are different from each other,
   wherein said voltage control data has a combination of said target delay data and said nominal voltage data for each of said plurality of modes, and
   said voltage control section selects the combination of said target delay data and said nominal voltage data corresponding to said mode specified by said DVFS section.

7. The semiconductor device according to claim 1, wherein the control target circuit section and the delay monitor circuit operate independent of each other.

8. The semiconductor device according to claim 1, wherein the control target circuit section and the delay monitor circuit are embedded in a same chip.

9. The semiconductor device according to claim 1, wherein said target delay data is determined based on a design constraint and a margin.

10. The semiconductor device according to claim 1, wherein said target delay data is set in advance before said measuring the delay.

11. The semiconductor according to claim 1, wherein said external signal is provided by an external unit.

12. The semiconductor device according to claim 1, wherein said control target circuit section and said delay monitor circuit are provided on a same chip.

13. The semiconductor device according to claim 1, further comprising another delay monitor circuit,
   wherein the voltage control section determines the supply voltage as a whole.

14. The semiconductor device according to claim 1, wherein said target delay register comprises a plurality of target delay registers.

15. The semiconductor device according to claim 1, wherein said monitor delay approaching to said target delay comprises said monitor delay and said target delay being made equal.

* * * * *